Sept. 15, 1964     O. R. SCHULER     3,148,441
METHOD OF MAKING ATTACHED FIN TYPE TUBES
Filed Sept. 14, 1959     8 Sheets-Sheet 1
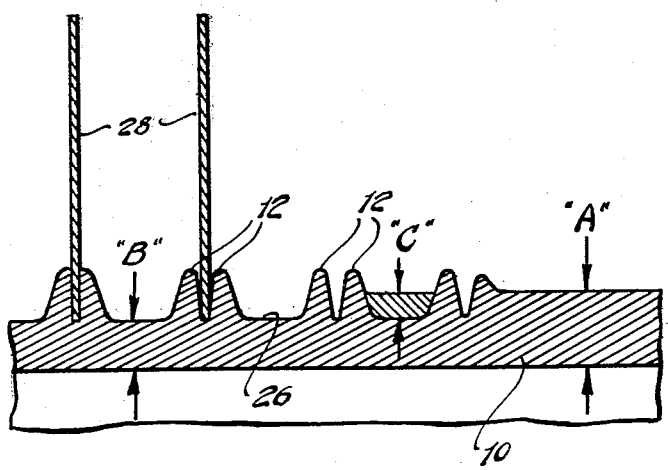
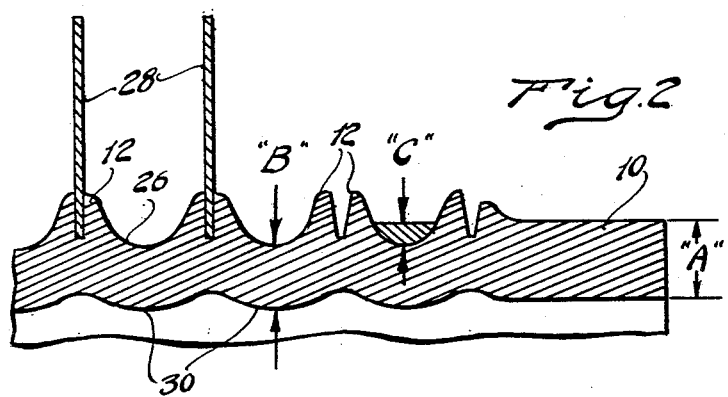
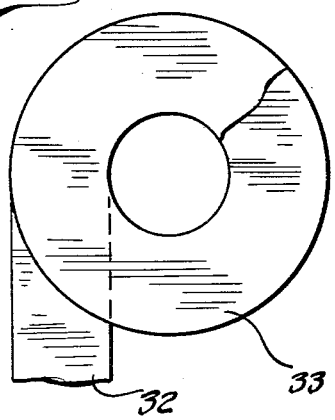 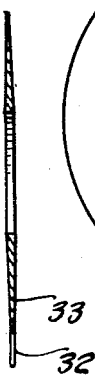 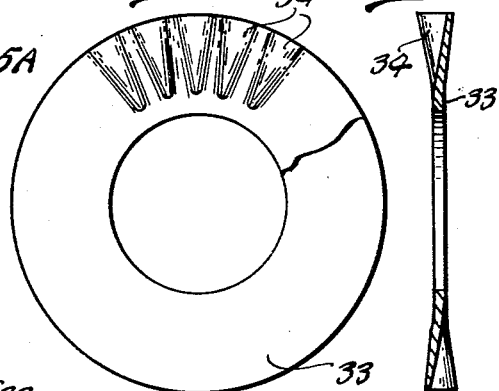
INVENTOR.
OTTO R. SCHULER
BY
ATTORNEYS.

Sept. 15, 1964        O. R. SCHULER        3,148,441
METHOD OF MAKING ATTACHED FIN TYPE TUBES
Filed Sept. 14, 1959        8 Sheets-Sheet 2
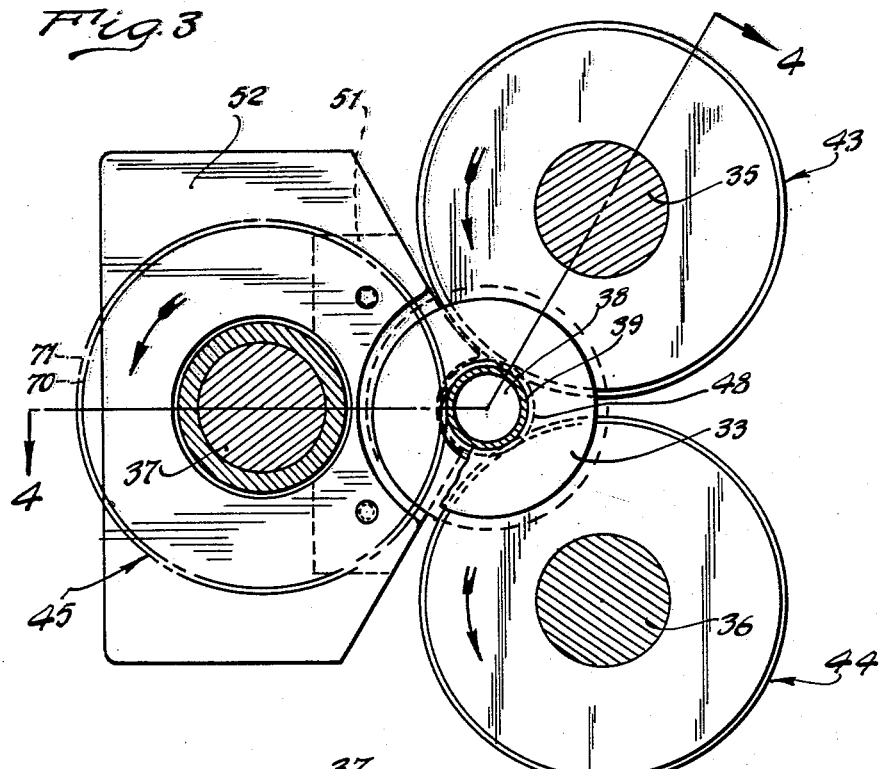
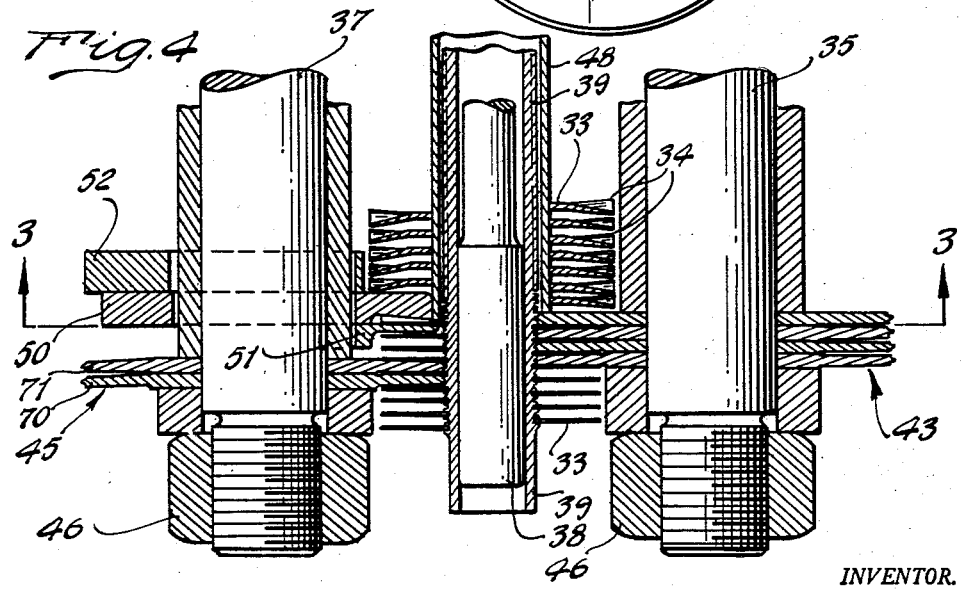
INVENTOR.
OTTO R. SCHULER.
BY
ATTORNEYS.

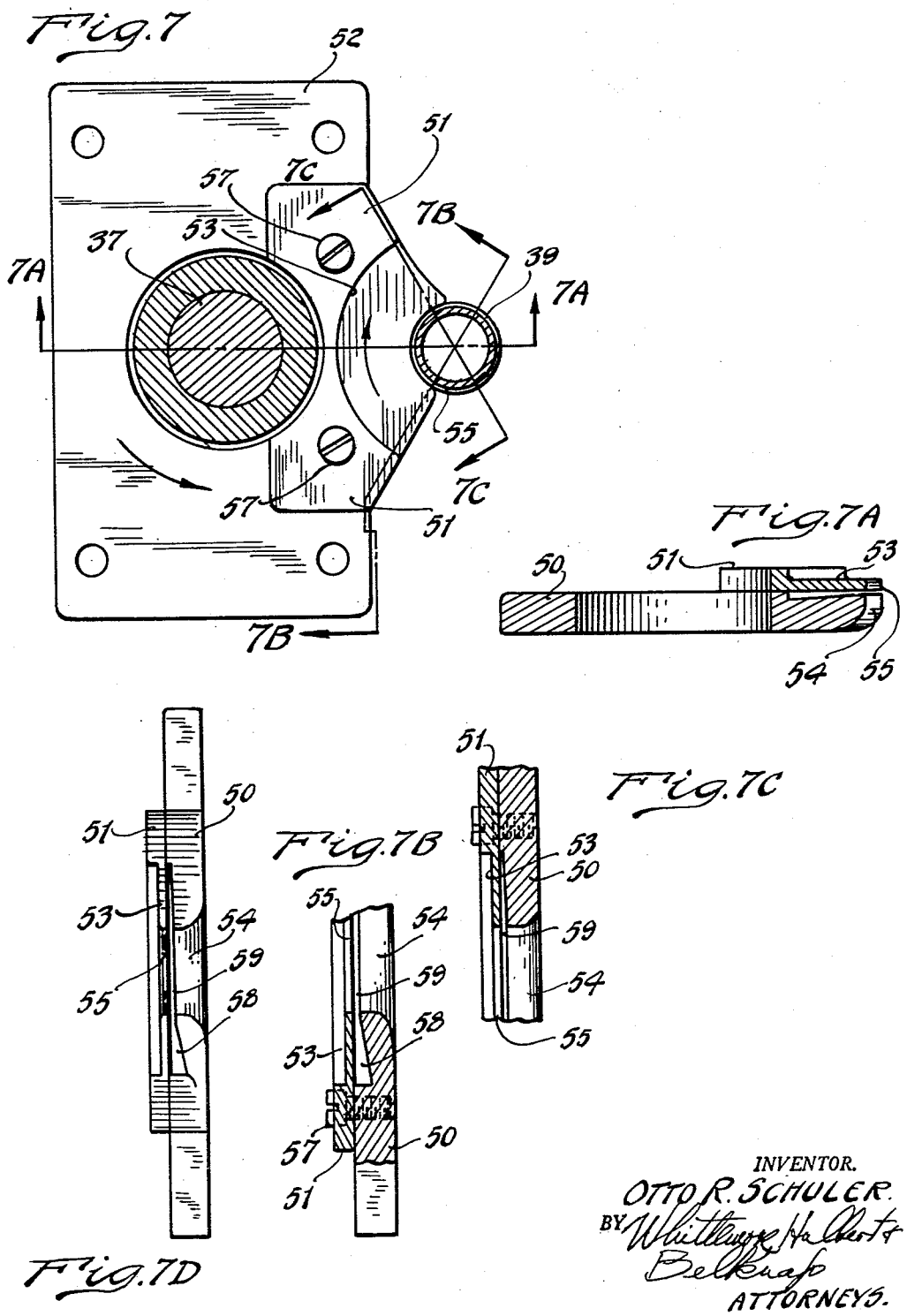

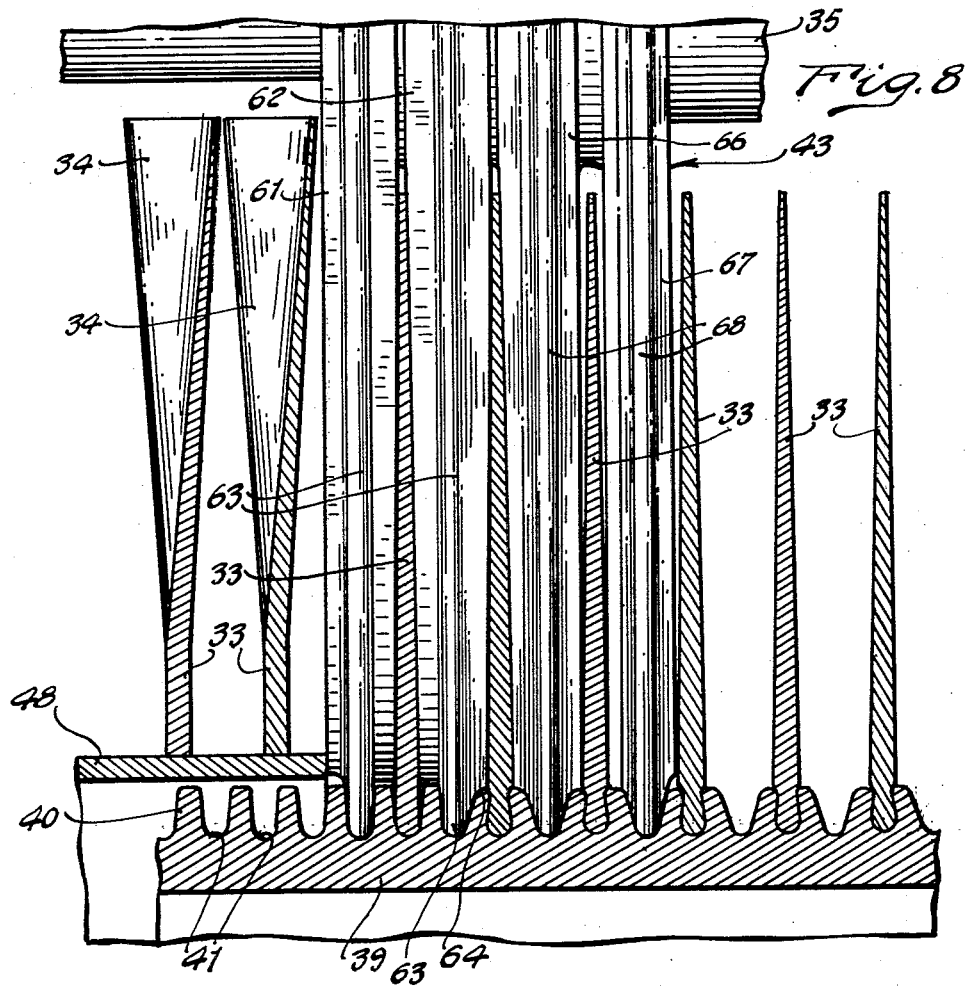

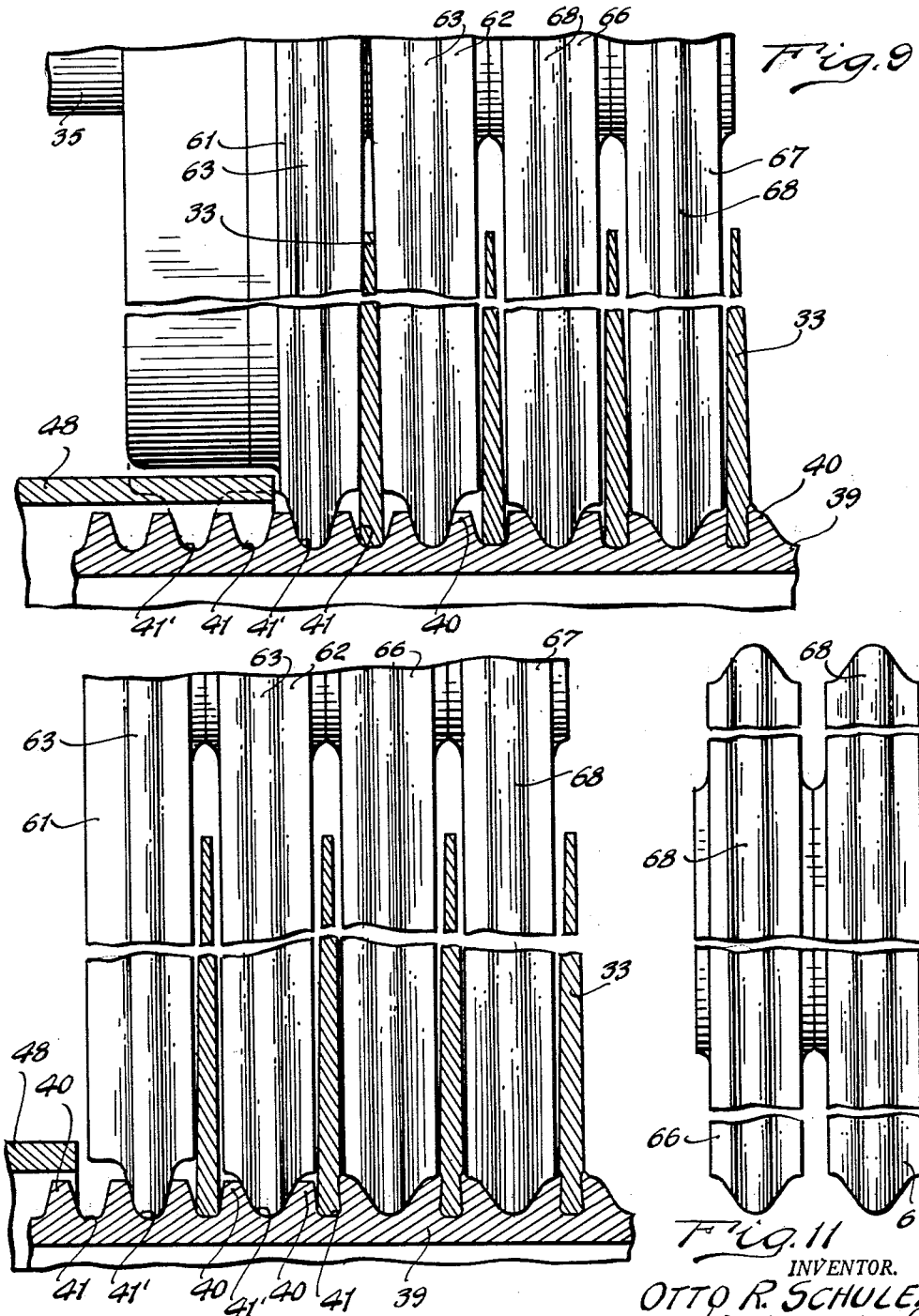

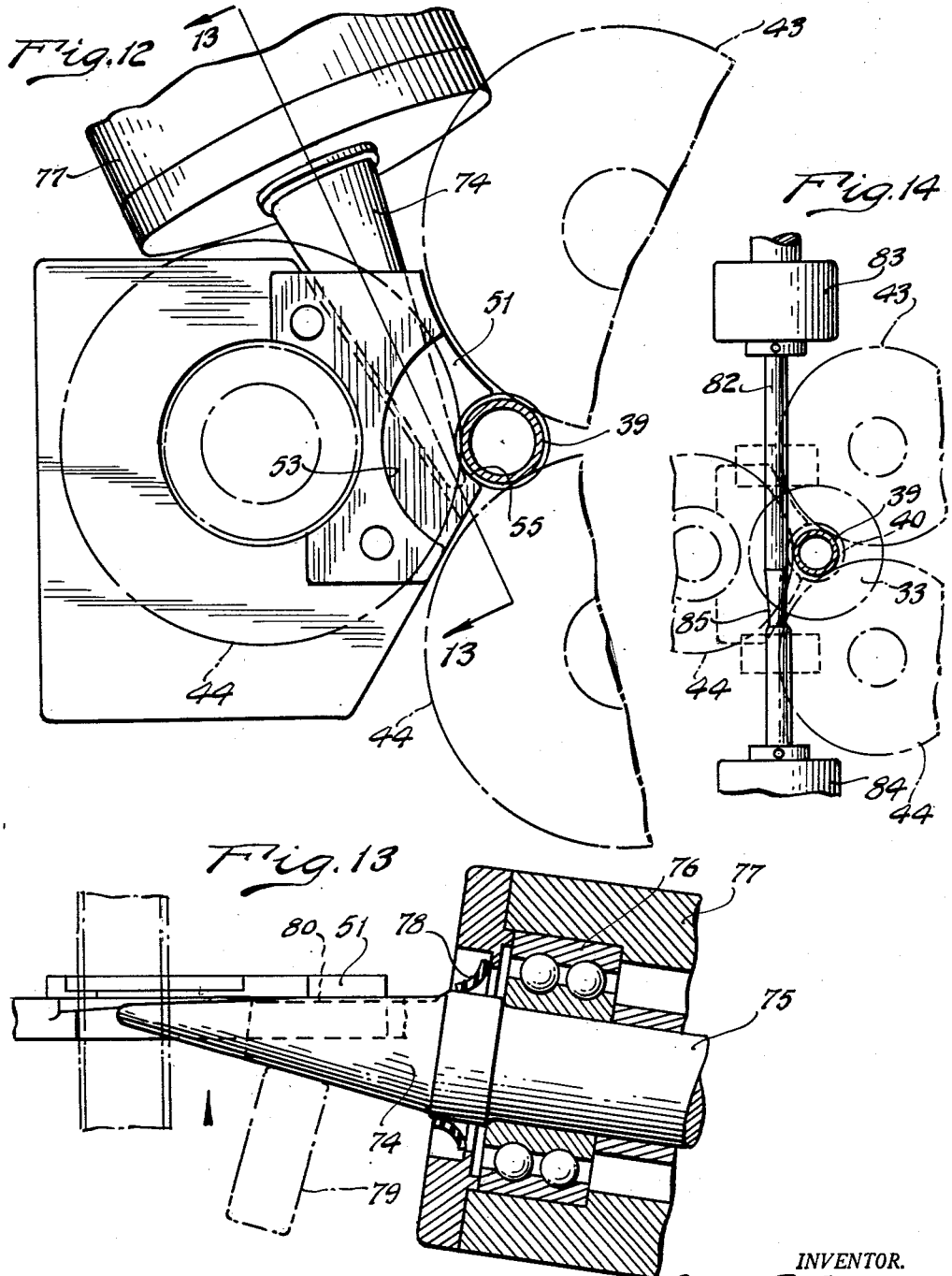

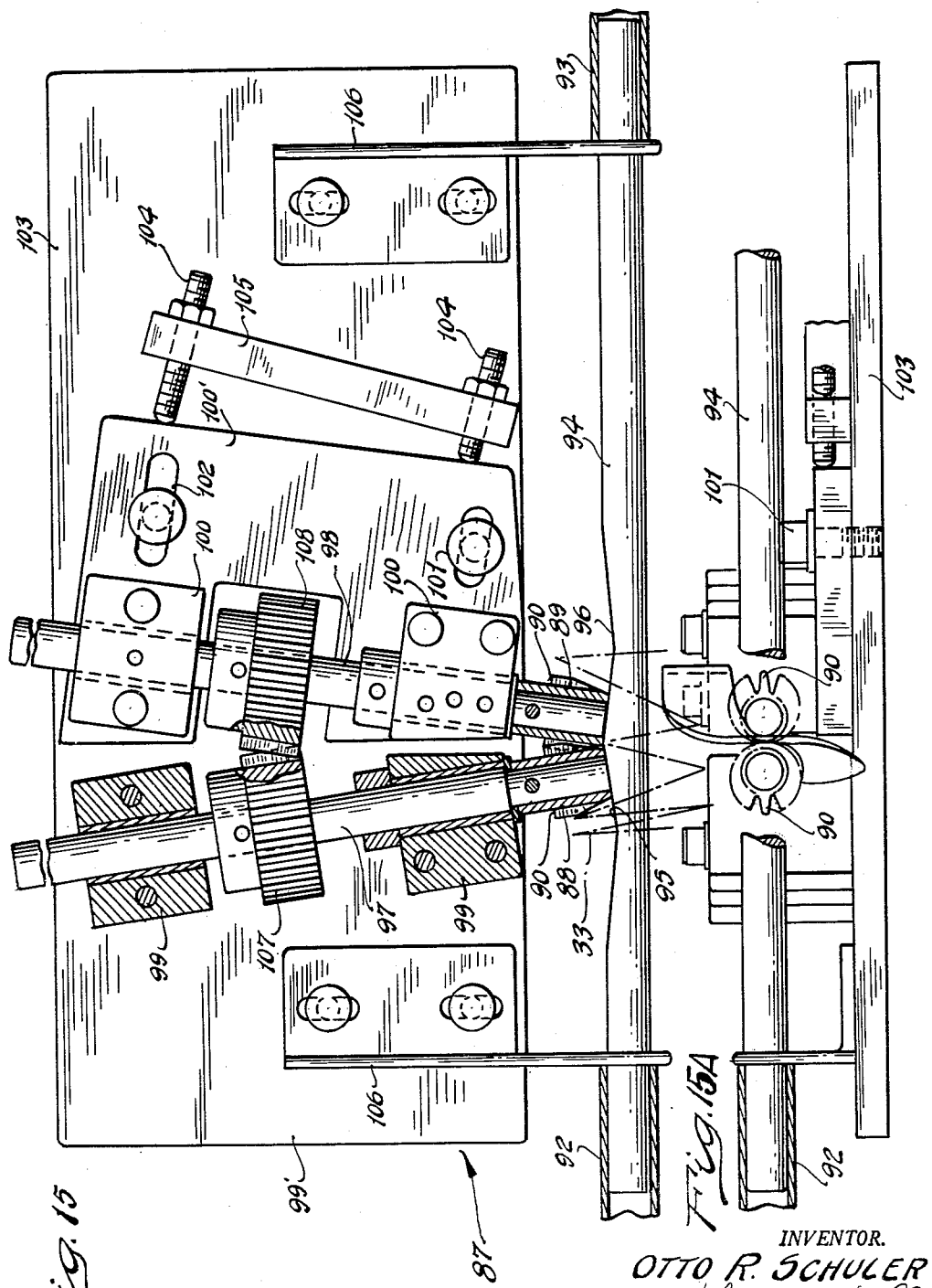

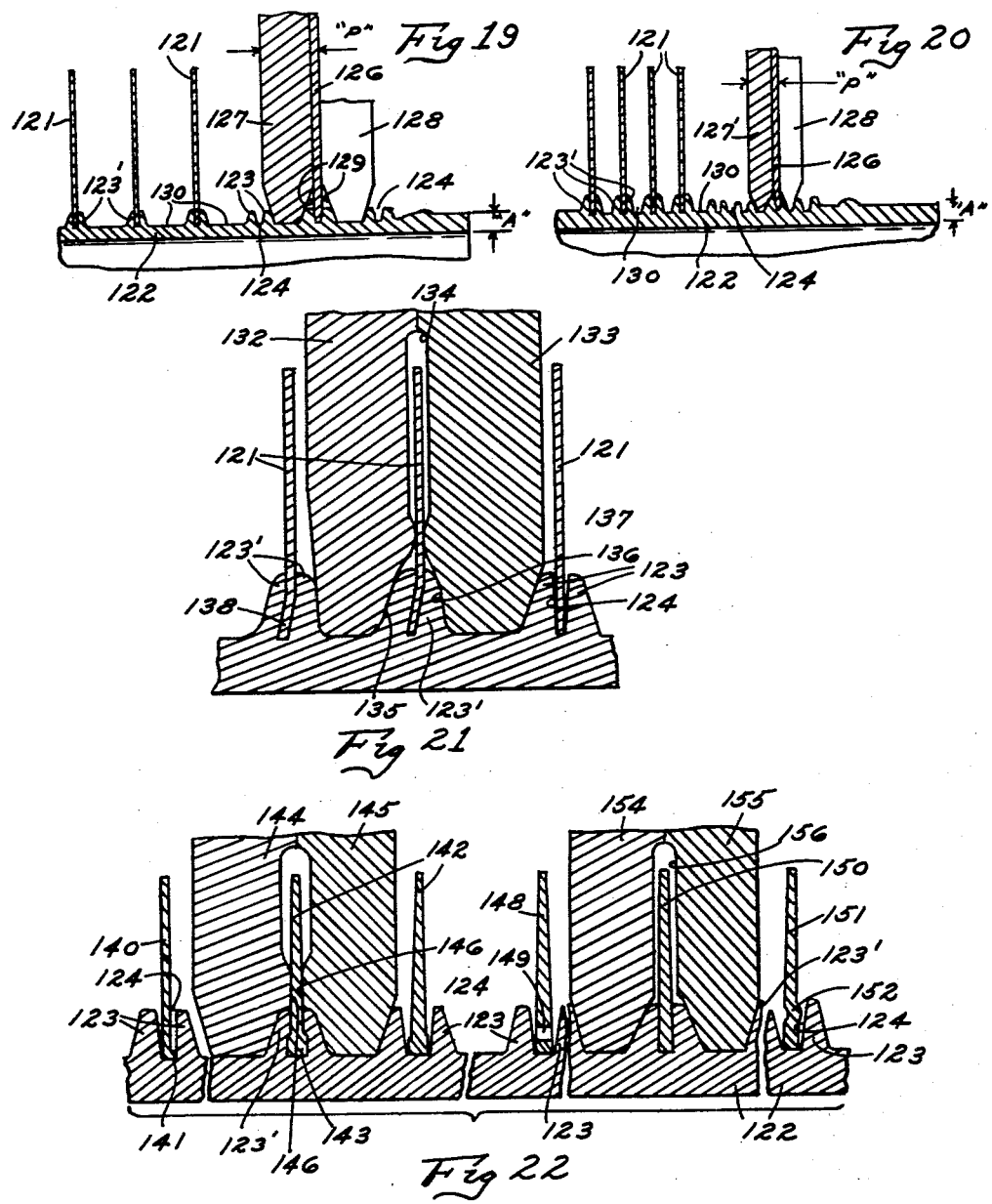

United States Patent Office 3,148,441
Patented Sept. 15, 1964

3,148,441
METHOD OF MAKING ATTACHED FIN TYPE TUBES
Otto R. Schuler, Detroit, Mich., assignor to Calumet & Hecla, Inc., Allen Park, Mich., a corporation of Michigan
Filed Sept. 14, 1959, Ser. No. 839,770
16 Claims. (Cl. 29—157.3)

The present invention relates to improvements in attached fin type tubes, for heat exchange and related uses, and to an improved method and apparatus for making the same. This application is a continuation-in-part of my copending application, Serial No. 734,573, filed May 12, 1958 (now abandoned).

The above entitled application covers an improvement in the art of attached fin tubes over previously followed methods of producing the tubing, usually involving the rolling of the exterior surface of a preformed tube, either annularly, helically or linearly to indent therein a fin-receiving groove or grooves whose depth in the tube material represents a substantial portion of the wall thickness of the tube.

With the grooving thus indented deeply therein it follows that the strength of the tube after the finning is applied to and clinched in the groove or grooves, as determined by the thinnest wall cross section, is represented only by the radial depth of tube material between its greatest internal periphery and the bottom or root of the grooving. The remainder of the metal of the tube, located radially outwardly of the groove root, is in effect excessive, and and superfluous in so far as increasing the tensional strength of the tube is concerned.

Furthermore, bending of a finned tube as produced by the known procedure is not practical without the probability of spreading somewhat the fin grooves of the tube at its outer bent arc, thus loosening the fins inasmuch as the lighter wall thickness at and beneath the bottom of the grooves will bend first. These considerations apply to some extent even if the fin is held in the groove by means supplementing the clinching action, as by fusion or the like.

It is therefore a general object of the present invention, in common with what is disclosed in the copending application identified above, to provide an improved attached fin tube, and an improved method of producing the same, wherein the foregoing drawbacks are avoided. This is accomplished in an operation in which the periphery of a preformed tube is rolled helically only sufficiently to upset and form on its exterior surface pairs of fin gripping ribs projecting radially therefrom in a substantial degree. These ribs are in pairs in closely spaced relation to one another to provide a narrow helical groove therebetween in which a thin strip of metal fin material can be inserted and secured tightly, by further rolling and pressing of the ribs against the sides of the strip at the base or inner peripheral edge thereof.

There thus results an attached fin type tubing in which the fin does not extend significantly into the actual radial body thickness of the tube wall, i.e., in which by far the major portion, if not all, of the fin receiving and gripping groove is located radially beyond the remainder of the rolled periphery of the tube; and in which metal corresponding to that which is usually excess in conventionally produced similar tubing is employed 100% in the contour of the projecting fin-receiving ribs and grooves.

As illustrated and described in my copending application, the method was one in which ribs, grooves and the spaces separating successive sets of ribs are simultaneously formed at mass production speed by combining sets of rib and groove forming rolling discs. However, this feature of simultaneous groove and rib formation is not an essential in the present improvement, which by preference contemplates the use of a pre-grooved tube.

Those skilled in the art will recognize the greater degree of difficulty of attaching to a helically grooved tube a so-called "high" fin strip (i.e., high ratio of outside diameter of fin strip to root diameter of tube groove, or inside fin diameter), than of attaching a low fin strip in which the corresponding ratio is substantially smaller. There is, of course, also greater difficulty in applying a fin, high or low, to a groove between ribs which are of relatively great radial depth, than between shallower ribs. The present invention primarily relates to an improved attached finned tube, and method of producing the same in which the fin strip is of relatively greater radial width or height, and in particular when such a strip is applied to grooves between high ribs, so that it is seen that the invention overcomes two prime factors of difficulty to be expected in an operation of the sort in question.

While a relatively low radius fin can be wrapped around a tube directly from a straight strip in a continuous operation, possibly resorting to a corrugation of the base of the fin, high fins are usually preformed in coil outline to certain inside diameters and shapes at their base; and in accordance with the present invention the fin strip material is also pre-shaped in coil form before attachment to the tube. However, as indicated above, the use of the aforementioned high type ribs on the tube has presented certain problems.

If the inside diameter of the pre-coiled fin is of the same or only slightly larger diameter than the root diameter of the tube groove, there is no practical way of inserting the fins between the ribs of the tube. If the inside diameter of the pre-coiled fins is left large enough, so that the fins can be slid axially over the outer edge of the tube ribs, an additional radial reduction becomes necessary to bring the base of the fins down to the root of the groove between the high ribs, either before or during the attaching operation. Extremely heavy reducing force must be employed for this.

While, in accordance with my above entitled copending application, the fins may be preformed directly on the same machine carrying the attaching tools, in advance of the latter, this is most practical when the fins are attached to a plain or relatively shallow-grooved tube, because there is no particular factor involved as to the requisite strength of the fin forming tools. The fins can be formed to almost the correct inside diameter and then moved, upon relative axial movement of the fin coil and tube, to the fin spacing and attaching tools, with relatively little force required for the attachment. The fins, in the alternative, can also be spaced and the tube then be expanded to force it tightly against the fin base. However, these expedients are not practical when a high fin is attached to a grooved tube bearing high fin-receiving and securing ribs.

Experience has shown that a tremendous rolling pressure must be applied to the fins especially when fabricated of hard metals or some alloys, simply to reduce the inside fin diameter down to the root of the tube. Very strong rolling tools are required and, since the spacing of the fins is predetermined by the spacing of the ribs on the tube, the reducing tool, at least on the outgoing axial side of the fin, may be made only as thick (hence as strong) as is allowed by the space between two adjacent fins, i.e., of the order of about .090" for a tube having 9 fins per inch. A tool of such thickness would readily break or bend, if its use were attempted in a high fin deep groove operation.

Therefore, it is a basic object of the present invention to provide a method of producing attached fin tubing in which, in an operation preceding the fin applying phase, relatively wide and thin fin strip is coiled to an inside diameter which may be slightly smaller than the root diameter of an external groove in a tube to which the fin is to be applied. The inside fin diameter may vary to some extent to permit any desired or special cross sectional shape pre-rolled at the base of the fin strip; and, likewise, the fins may be smooth over a full radial width, or may be specially rolled in this regard.

In further accordance with the invention, such preformed fin coil is then corrugated along its outer periphery, as by resort to a special corrugating machine hereinafter described, or, in the alternative, by manual corrugating tools. As a result of the external side corrugation of the fin, the inside diameter of the fin is increased, and, in fact, the whole fin will be enlarged in diameter, but without losing its other original properties as to shape. It is the purpose of the corrugating step to increase the internal fin diameter enough to enable the coil to externally clear the high tube ribs; and the shape and axial depth of the corrugations will be determined by the final desired shape of the finished fin on the tube, as well as by the desired radial clearance for sliding the fins over the ribbed tube.

In accordance with another object of the invention, a method and apparatus are provided in which the sliding of the fin material over the tube ribs is assisted by the use of an axial sleeve coaxially surrounding the tube outwardly of its rib radius, to the end of preventing possible tangling or fouling of the loose fin coils with the tube ribs during the fin guide-in and attaching operation. The guide sleeve in question is preferably rotated coordinately with the tube in order to relieve the attaching tools from the work of advancing the fin material during the attaching operation.

In still further accordance with the basic objective, provision is made to smooth out the outer peripheral corrugations preformed in the fin, during the guiding in and application of the fin material to the tube groove. This reduces the inside diameter of the fins to a diameter corresponding to the groove root, prior to attachment between the two ribs. Only a fraction of the power is needed to thus bring this fin diameter to groove root diameter, as compared with methods involving the radially inward rolling of the fin between the ribs. In this connection, it may be found advisable to anneal corrugated fins which are made of the harder metals, especially when the fins are to be narrowly spaced, in order to avoid damage to fin attaching tools as they roll the ribs against the fin base.

It is another object to provide a method and apparatus for performing the same in which a fixed plate unit is employed as part of the equipment for guiding in and smoothing the fin. One plate of this unit is on the incoming or rearward axial side of the fin material and, because of available space in this zone, may be of heavy and strong construction, with a suitable contour for smoothing out the outer fin corrugations incorporated in this plate. The other plate of the unit, on the forward or outgoing axial side of the fin material, coacts with the first plate, and is necessarily limited in thickness as determined by the space between successive fin coils into which it extends.

In an alternative embodiment, the invention contemplates the use, in substitution for the heavier fixed guide and preliminary smoothing plate, on the incoming side of the fin material, a small diameter tapered roller, which may be driven at a desired speed or simply turn as an idler.

Further in accordance with the invention, it is an object to provide apparatus incorporating guide and corrugation smoothing provisions, as described above, in combination with one or more coaxial guide and smoothing discs on one of three arbors spaced equally about the axis of the tube. These act in conjunction with a further disc or discs on the three arbors rolling in certain of tube grooves and operating to deform and force the material of the ribs into tight gripping engagement with the base of the fins. The initial guide and smoothing discs progressively further iron out the outer peripheral corrugations of the fin stock, as commenced by the guide and smoothing means described, as well as tending to force the fin material radially onto the root of the tube groove.

Another object of the invention is to provide an improved attached fin tube, and method and apparatus for forming the latter, in which fin material of various cross sections may be employed, as dictated by the requirements of the particular job, and may be variably clinched at the fin base.

Still another general object of the invention is to provide a method of producing an improved finned tube, in which the periphery of a preformed tube is rolled helically only sufficiently to upset and form on its exterior surface pairs of fin gripping ribs projecting radially therefrom in a substantial degree. These ribs are in closely spaced relation to one another to provide a narrow groove therebetween in which a thin metal strip of fin material can be inserted and secured tightly, by further rolling and pressing of the ribs against the sides of the strip at the base or inner peripheral edge thereof.

A further object along this line is to provide a multiple finning method of rolling ribs and grooves as described, in which ribs, grooves and the space separating successive sets of ribs are simultaneously formed at mass production speed by combining sets of rib and groove forming rolling discs. This multiple finning procedure enables the spacing of the mounted fins from one another to be varied as desired.

Yet another object is to provide a production method as described, in which rolling discs which secure the fin between the ribs previously formed in the stated manner are of special design, causing the fin strip to be tightly and positively interlocked with the fin ribs in one way or another, in accordance with the several adaptations herein shown, so that it will never come loose under the most severe operating conditions.

Another object is to provide a multiple disc ribbing and finning method of this sort, in which the discs operating on the tube to form the fin-receiving ribs may be of optional axial thickness, enabling the space between successive pairs of fin ribs to be varied. Thus, a disc which forms the fin groove between two projecting ribs is usually considerably thinner than those on either side thereof which roll the tube material between two succeeding pairs of fin ribs, the thickness of the last named discs being in turn chosen to provide the desired fin spacing.

Yet another object is to provide such a multiple rib and fin rolling procedure which not only enables the spacing between successive pairs of ribs to be varied, but also permits the effective diameter of the tube at the root of the fin groove, the strength and height of the fin securing ribs, and the manner of rolling the latter to secure the strip to be controlled by an appropriate selection of rib rolling and fin securing discs.

The foregoing as well as other objects will become more apparent as this description proceeds, especially when considered in connection with the accompanying drawings illustrating preferred embodiments of the invention, wherein:

FIGS. 1 and 2 are fragmentary views in axial section and of a schematic nature, illustrating advantages of the improvement in accordance with my copending application identified above;

FIG. 3 is a view vertically sectioned along line 3—3 of FIG. 4, of a suitable apparatus for guiding pre-coiled and pre-corrugated fin strip material into position between pre-formed ribs of a tube, while smoothing the corrugations of the fin material, for forcing the fin material snugly into the groove between ribs and for attaching the ribs to the fin base;

FIG. 4 is a view in section along broken line 4—4 of FIG. 3;

FIGS. 5 and 5A are, respectively, fragmentary views in end elevation and axial cross section through fin strip material as pre-coiled to a predetermined internal diameter;

FIGS. 6 and 6A are, respectively, corresponding views in end elevation and axial section through the coiled strip material as pre-corrugated along the external side surfaces of its coil convolution by mechanism also contemplated by the invention;

FIG. 7 is a fragmentary view in vertical section similar to FIG. 3, showing only the initial fixed fin guide and smoothing provisions of the invention;

FIGS. 7A, 7B and 7C are, respectively, views in section along lines 7A—7A, 7B—7B and 7C—7C of FIG. 7;

FIG. 7D is a view in side elevation of the fixed fin guide structure at the point of entrance of the corrugated fin material thereinto;

FIG. 8 is a fragmentary view in enlarged scale and in section on an axially extending radial plane through one type of grooved and ribbed tube and fin material being applied and secured thereto in accordance with the method of the invention, also showing the character of the axial fin guide sleeve of the apparatus and successive fin guiding, smoothing and attaching discs on one of three arbors depicted in FIG. 3;

FIGS. 9, 10 and 11 are similar fragmentary views, all in an axially and radially extending plane similar to FIG. 8, showing further typical arrangements of sets of fin guiding, smoothing and attaching discs contemplated by the invention, in their respective relationships to the grooved and ribbed tube and the fin guide sleeve of the equipment;

FIG. 12 is a fragmentary view of a modified fin guide arrangement, in which a tapered roller of small diameter is used in substitution for the thicker of two fixed fin guide and smoothing plates employed in the preceding form;

FIG. 13 is a fragmentary view in section axially of the tapered roller of FIG. 12, i.e., along line 13—13 of that figure;

FIG. 14 is a further fragmentary and schematic view of another modified embodiment, in which an elongated fin guide and smoothing roller or stem is employed, having bearing means on opposite sides of its zone of guiding and smoothing engagement with the fin;

FIG. 15 is a plan view, partially in axial section, of a proposed apparatus or fixture for temporarily corrugating the coil fin material along the sides of its external periphery, prior to application of the fin to the tube by structure such as is shown in FIGS. 3, 4, 7 through 7D and 8 through 14;

FIG. 15A is a fragmentary elevational view of the apparatus of FIG. 15;

FIGS. 16, 16A, 16B and 16C are fragmentary views in radial cross section through fins presenting various types of special base conformation, such as may be adopted as dictated by the requirements or desired characteristics of the tube;

FIG. 17 is a view in radial section through a fin strip as specially conformed at its ends for another possible type of fin interlock, fin material of this cross section being adapted to be cut in half to provide two like fins;

FIG. 17A is a view in similar section showing the strip material of FIG. 17 as halved and further rolled to alter its cross sectional contour; and FIG. 18 is a view in section similar to FIG. 17, showing yet another possible fin contour.

FIGS. 19 and 20 are fragmentary views in axial section and somewhat enlarged scale illustrating the production of tubing of optional fin spacing by the multiple ribbing and finning method of the invention;

FIG. 21 is a fragmentary view in further enlarged scale and in axial section showing the interlocked clinching of fin material to the fin ribs by the use of special rolling discs;

FIG. 22 is a view similar to FIG. 21 illustrating further and alternative embodiments for rolling and clinching the fins, this view also showing various types of fin base formation to enhance the interlock between fin and grooved ribs.

Prior to describing procedural and structural features of the present invention, note should be taken that, as illustrated and described in my identified copending application, presently employed fin attaching procedures involve the use of a tube externally pre-formed by an indenting or embossing type rolling operation to provide annular or helical fin-receiving groove formations which extend a substantial radial depth into the tube from its outer circumference. Fin material, either in the form of individual discs or (as herein shown) in the form of continuous helically wound metal strip stock, is assembled to these grooves and clinched therein by a further rolling operation in which a very slight amount of protuberant material of the tube is forced radially and axially inwardly against the base of the fin.

On the assumption that the determining factor of the strength of the tube is its thinnest wall section, this wall section is in effect represented by a radial portion of the tube wall thickness from the bottom or root of its external groove to the largest inside diameter of the tube. Thus, the thickness of metal between the bottom of the groove and the external surface of the tube is actually excess and superfluous, in that it does not materially increase the strength of the tube but is dormant and, furthermore, prevents successful bending of the tube as a practical matter, since the lighter wall thickness at the bottom of the grooves will bend most readily, with the result that the grip on the fins will be loosened.

By contrast, and as shown in FIG. 1, which quite schematically shows an attached fin type tube of the invention and certain steps in its formation, the improved method takes full advantage of this otherwise excess material, of radial thickness "C" of a pre-rolled tube 10, by using it in the formation of ribs 12 extending radially substantially outwardly of the surface of the tube 10. The major portion of the depth of the fin grooves between such ribs lies outwardly of the outer tube periphery; and there is little or no recessing of the tube inwardly of the roots of the tube spaces 26 which separate successive rib pairs 12. This is also done with a minimum reduction of the thickness of tube 10 from its original wall thickness "A" to its final and effective wall thickness "B."

Higher ribs 12 are produced, giving a much better bond between the same and the helical fin strip 28 for the same initial tube thickness "A." In the alternative, a somewhat lower rib may be formed with the root of the pre-rolled groove even lying slightly within the spacer surface 26 in the radial sense, if desired; but still a much heavier final and effective wall thickness "B" is produced, again starting with the same tube thickness "A." If the body of the tube is grooved at all the extent of the indentation may be much less than in previous attached fin products. Indeed, the method allows a control of the wall dimension such that it can even be made thinner between the fins than radially underneath the applied fin.

FIG. 2 shows an alternate variation, in which, for improved adaptability for bending or other purposes, the inside of the tube 10 may be formed with relatively deep corrugations 30. Such a tube can be manufactured with a uniform wall thickness or with a controllable variation in wall thickness, enabling the metal to be put in the places where it is most needed.

My copending application identified above, to which reference may be had, discloses methods of rolling the tube 10 to form thereon rib and groove formations of the above type. These considerations constitute no part of the present invention, whose primary point in common with said application lies in the provision of a tube which is not deeply indented as to the body mass of the tube.

Reference should now be had to FIGS. 5, 5A, 6 and 6A of the drawings, as disclosing the method by which the fin strip stock employed for fins, corresponding in function to those designated 28 in FIGS. 1 and 2, is initially pre-treated in accordance with the invention. As typically produced in a flat and thin length 32, the fin material is shaped into a continuous outline of helical coil convolution 33 which may at its inner periphery be slightly smaller than the external root diameter of a tube groove, although as indicated above this inside diameter may vary in the event of a special shape at the base of the fin, or special attaching requirements. The fin convolutions 33 are usually smooth across their entire radial width, unless it is desired that they be specially formed in cross section as will appear.

These preformed fin convolutions are then corrugated on their opposite sides and radially inwardly from the outer periphery thereof, as by the use of equipment such as is illustrated in FIGS. 15 and 16 or by equivalent hand equipment. The resulting corrugated coil product is shown in FIGS. 6 and 6A, the corrugations in question being designated 34. As the result of the corrugating operation the entire coil, including its inner diameter, is enlarged in the diametral sense, but without loss of any other characteristics of the coil material, such as any desired special cross sectional outline. If it is desired that, in the ultimate attached fin product, the helical fin retain a corrugated outline about its periphery, the initial corrugations 34 of the convolution 33 will be made more deep than otherwise, then smoothed or ironed out later to the desired final depth as by modifying accordingly the smoothing plates and discs of the apparatus (to be described).

As appears from the above, it has been found that the inside diameter of the preformed fin material 33 does not have to be held to extremely close tolerance, and shallow ripples may also be present on the inner periphery which will absorb the variation in tolerances. However, the maximum inner diameter of the preformed fin coil convolution, prior to corrugating should still be somewhat smaller than the root diameter of the tube groove so as to insure a tight fit and seat of the fin material on the root.

Now referring to FIGS. 3, 4 and 7–7D, inclusive, as schematically shown in those figures the equipment employed in performing the method of the invention essentially comprises a set of three parallel shafts or arbors 35, 36 and 37 uniformly distributed in 120° spacing about a parallel fixed center mandrel 38, about which a tube 39 is continuously advanced in the axial direction, in an entirely conventional manner. As indicated above, the tube 39 has been preliminarily rolled to produce the helical ribs 40 on either side of grooves 41, into certain of which the fin strip material 33 is to be guided. FIG. 8 shows the ribs and their spacing from one another in the axial direction to be uniform; whereas FIGS. 9, 10 and 11 more typically show the rolling of the tube to be carried out in such manner as to provide fin receiving grooves which are of considerably less axial width than the spaces between successive pairs of ribs which define such grooves. In this respect FIGS. 9, 10 and 11 show the actual invention in approximate accordance with FIGS. 1 and 2, described above. However, FIG. 8 is drawn in larger scale to represent an illustrative arrangement in conformity with what is shown in FIGS. 3 and 4.

Each of the arbors 35, 36, 37 has fixedly mounted thereon an axial set or series of discs for fin guiding, smoothing and/or attaching, the sets on the arbors 35, 36, 37 being, for convenience, generally designated 43, 44 and 45, respectively. Suitable fastening nuts 46 applied on the arbor ends hold the discs fixedly on the respective arbors, and the character of the discs of the several sets of discs is hereinafter touched on in connection with FIGS. 8 through 11. It may be noted here that, in addition to attaching discs similar to those of arbors 36 and 37, the arbor 35 carries one or more guiding and smoothing discs.

In order to enable the corrugated and coiled fin material to be fed onto the tube 39, the equipment of FIGS. 3 and 4 includes an elongated tubular fin guiding member or sleeve 48 extending axially of tube 39 and through which the tube is fed axially, suitable provision being made to rotate the tube 39. Its presence positively supports and prevents the snagging or tangling of the coiled fin material 33 with the grooves of the tube, as the fin material is fed into the tube grooves in the progressive advance of the tube, under control by the corrugation smoothing and fin guiding provisions of the invention. As to these provisions, reference should now be had to FIGS. 7, 7A, 7B, 7C and 7D, considered in conjunction with FIGS. 3, 4 and 8.

The smoothing and guiding provisions in question include a pair of relatively thick and thin, fixed fin guiding and smoothing plates, respectively designated 50 and 51. These plates are appropriately bolted or otherwise secured to a rigidly mounted suspending bracket 52 to one side of the mandrel 38 and fin guide sleeve 48. Plate 50 may be as thick as necessary in the axial direction, since it is located on the incoming axial side of the fin to the coil in which space is available to accommodate the thickness. On the other hand, since plate 51 must be no thicker than is allowed by the available space between successive fin convolutions, it is further reduced in thickness in an arcuate zone facing the tube axis, as by milling or otherwise cutting away the recess 53 on the axially forward side of the plate.

Both of the plates 50, 51 are formed on their edge facing the axis of tube 39 to provide arcuate seats 54, 55, respectively, which are concentric with the tube axis and of sufficient radius of curvature to outwardly clear the radial ribs 40 of the tube, as the latter travels axially past the plates.

FIGS. 7, 7B and 7C show the use of bolts or studs 57 for the purpose of affixing the plates 50, 51 to the fixed bracket 52, the bolts or studs 57 extending through both plates for this purpose.

As shown in FIG. 7D and sectional views 7A, 7B and 7C, while the thinner plate 51 is symmetric in formation in reference to a horizontal center line, the thicker plate 50 is formed, on its axially forward surface adjacent the plate 51 to provide an entrance throat 58 of relatively wide and tapered outline which merges into an arcuate and narrow, flat-sided recess 59 about the inner arc of plate 50. It is into the throat 58 that the corrugated outer zone 34 of the fin material is introduced, with a resulting progressive smoothing or flattening of the corrugations of the strip in recess 59 as it is guided by plates 50, 51 into the tube grooves 41 between ribs 40. Thus preliminary treatment of the strip stock, coupled with further smoothing action by the respective disc sets 43, has the effect of reducing and returning the lower diameter of the fin convolution to the approximate diameter of the root of a tube groove 41, into which the fin is finally urged and secured by the disc sets 43, 44, 45.

As indicated above and shown in FIGS. 4 and 8, there are two discs 61 and 62 of the set 43 which are secured on the arbor 35 in an axial spacing from one another approximating or only slightly greater than the axial thickness of the fin 33. The discs 61, 62 are primarily guiding and smoothing discs, each having a continuous annular center rim or bead 63 following in the space between two ribs 40 which are subsequently to be deformed in opposite axial directions to grip the base of the fin 33. In some instances only one such guiding and smoothing discs may be sufficient. As indicated in FIG. 8, the disc 62 may be provided on its forward annular edge with a formation 64 for the purpose of deforming the rib and clinching it to the fin 33.

The other two discs of the set 43 on the arbor 35 are fin deforming and attaching discs, being respectively designated 66 and 67. They have annular outer beads 68 which follow in the space between successive pairs of tube ribs 40, and the sectional contour of the discs 66, 67 on opposite sides of the respective annular beads 68 is such as to cause the ribs of the respective pairs to be deformed inwardly into clinching and securing engagement with the base of the fin 33.

The disc sets 43, 44, 45 are rotated in the direction indicated by arrows in FIG. 3; and the respective sets 44 and 45 on arbors 36, 37 may each be simply comprised of a pair of attaching and securing discs, designated 70 and 71 in FIG. 4. Their form and function are the same as the respective discs 66, 67 on arbor 35, i.e., of causing clinching engagement of the ribs 40 with the fin base, but without sufficient restriction to the normal movement of the fin to cause the latter to buckle or tear. This is a matter which may call for special design of the discs for any given job, controlled in part by the extent that the flattened fin material has already been restricted in inner diameter by the preceding action of the discs 61, 62.

In causing the ribs 40 to be deformed and tightly clinched against the fins, a slight elongation of the tube may result, as under the action of the disc sets 44, 45 on arbors 36, 37, respectively. Should this elongation in certain spacings of the fin coils 33 be sufficient to prevent evenly spaced discs from correctly tracking into grooves of a tube, it can be corrected by making the discs thicker or wider pitch to compensate for the elongation. The variation in pitch between discs is not great enough to affect the fixed pitch angle setting of the arbors, since few discs are used on each arbor. Moreover, larger sizes of discs have a degree of compensating flexibility.

FIGS. 9, 10 and 11 show arrangements in which the grooves between successive ribs 40 by which the fin is clinched are, as before, designated 41, while grooves or spaces between successive pairs of such fin gripping ribs are specially designated 41'. The arrangements of FIGS. 9, 10 and 11 are generally similar to one another, varying in reference to cross sectional disc contours. These figures illustrate the progressive action of the discs in guiding and smoothing the fin convolutions, and in clinching the fin base between ribs 40. Specifically, the discs are designed for attachment of steel fin coils of ¾ inch radial height, 6½ fins per inch, to a steel tube having a 1 inch diameter at the root of fin groove 41, the ribs 40 being .045 inch in height. These arrangements afford good results and may be regarded as typical examples.

In the apparatus embodiment of the invention described above, preliminary guiding and smoothing of the fin convolution 33 is accomplished through the agency of fixed plates 50 and 51. FIGS. 12 and 13 illustrate an alternative embodiment, in which a rotary guide and smoothing member is substituted for the thicker guide plate 50. This member is in the form of a tapered roller or axially extending stem 74 of small diameter extending at an angle into the space which is, in the other form, occupied by the thicker fixed plate 50. The nose of the tapered roller is located in a position to just clear the ribs 40 of tube 39.

The roller 74 rotates along the incoming side of the fin convolution 33, smoothing its corrugations in conjunction with the thinner plate 51. As shown in FIG. 13, the shaft 75 of the roller is mounted by a ball bearing 76 in a suitable fixed housing 77, with a seal 78 in engagement with the stem to preclude the entry of foreign matter. Tapered roller 74 may function as an idler, or may be rotated at a relatively fast speed by suitable means (not shown).

As also indicated in FIG. 13, it may be desirable to back up the roller 74 and thus maintain the desired rolling pressure on the fin corrugations, as by means of a suitable fixedly journaled backing or bearing roller 79 shown in dotted line in FIG. 13. It may also be desired to relieve the tapered roller 74 circumferentially, as by an annular undercut 80 on the roller behind its inner tapered rolling tip, as also indicated in dotted line in FIG. 13; and if the backing roller 79 is employed it will roll along the surface of such undercut.

FIG. 14 discloses a further arrangement in which a guiding and smoothing roller performing the function of tapered roller 74 is elongated in character, as the elongated stem 82 mounted by bearings (not shown) for rotation in longitudinally fixed and aligned housings 83, 84 at opposite sides of the fin smoothing area. A tapered portion 85 is provided on the smoothing roller at the rolling zone.

FIGS. 15 and 15A illustrate a suitable device or fixture, generally designated 87, for the initial formation on the coil fin strip stock 33 of the external corrugations 34 by which the internal diameter of the coil is increased sufficiently to enable its advance along the guide sleeve 48.

The coiled fin material 33 is shown in light line in FIG. 15 and in heavier line in FIG. 15A. It is corrugated along its outer peripheral sides by coacting corrugating tools in the form of tapered toothed, gear-like elements 88, 89, which may be formed by bringing or otherwise shaping standard gears to the tapered outline of FIGS. 15 and 15A. The teeth 90 of these tools, as suitably driven in a way to be described, follow one another in indenting engagement with the material of the fin coil to produce the outer side corrugations 34 shown in FIGS. 6 and 6A of the drawings.

The coil stock is guided over sleeve extensions 92, 93 at either end thereof, which may be mounted for rotating movement, onto and off of an elongated stationary rod 94. Rod 94 is medially formed at 95, 96 to provide mildly angled surfaces against which the noses of the tapered corrugating tools 88, 89 may abut.

The tools 88, 89 are fixed on divergent shafts 97, 98, respectively, which are suitably journaled in appropriate brackets 99, 100. These brackets are carried on relatively adjustable horizontal plates 99', 100' which may be moved as desired, then clamped in adjusted position, as by suitable bolts 101 engaging through elongated slots 102 in plates 99', 100' and taking into a fixed horizontal base 103. Adjustment may be had by manipulation of set screws 104 threaded in a cross block 105 fixed on base 103. Suitable adjustable brackets 106 on the base 103 support the fixed shaft 94, enabling a lateral adjustment of the latter for properly positioning it in relation to the corrugating tools 88, 89.

The drive of the shafts 97, 98 of the respective corrugating tools 88, 89 is through standard gears 107, 108 in mesh at an angle determined by the setting of the respective shafts, one of these gears being driven in an appropriate fashion.

Mention has been made above of the fact that various cross sectional configurations of fin material may be employed in accordance with the invention; and FIGS. 16, 16A, 16B and 16C show illustrative types.

In accordance with FIG. 16, the fin material 33 may be provided with an enlarged annular offset 110 at the base thereof which is of almost the same thickness as the width of the groove 41 at the fin base.

In FIG. 16A the fin has a double offset of increased thickness, i.e., at its extreme inner base and in radially outwardly spaced relation thereto, as at 111 and 112, for the purpose of interlocking the fins and ribs and holding the latter securely to the fins. This type is recommended for high temperature applications.

In accordance with FIG. 16B, the fin 33 is folded upon itself around its inner circumference, as at 113, and the corresponding tube rib 40 is turned over toward the fin and into gripping and retaining engagement at 114 outwardly of the reversed fin portion 113.

FIG. 16C shows a further possible modification, in which the inner periphery of the fin 33 is corrugated or rippled at its base, as indicated by the numeral 115, so as to fill out the groove 41. Although empty spaces are left between such ripples, this type of fin contour affords a good connection.

It is further contemplated that, in order to enhance the fin-tube connection the sides of the fin 33 may be knurled or otherwise roughened around its inner periphery.

FIG. 17 shows a still further possible fin contour, and a method of making the same. A preformed strip 117 of double width of the intended fin is produced, the thickness thereof tapering outwardly to the center of the strip from both sides of the center. The outer extremities of the thus formed strip are formed in a semi-circular outline at 118, in contemplation of the interlocking of the tube ribs with a thus contoured fin base. The double width strip is then severed and rolled to the tapering outline shown in FIG. 17A, its inner periphery at 119 being thinner than the remainder of the fin.

FIG. 18 shows an alternative fin form, which is capable of production in the manner of FIGS. 17 and 17A, in this case having its internal periphery formed to provide divergent prongs 120 for locking engagement with the tube ribs.

It is seen from the above that the invention provides a novel attached fin type tube, and a method and apparatus for producing the same inexpensively and expeditiously, without requiring the tremendous rolling pressure which would be otherwise necessary, especially in the case of fins and tubes of hard metals or some alloys, to reduce the fin to fit a groove between high tube ribs. The initial corrugation of the fin sides around the periphery of the coil fin material increases the inner diameter to enable the material to be easily slid longitudinally in relation to the high-ribbing of the tube, and the guide sleeve 48 further facilitates this, preventing any possibility of fouling or tangling of the fin material with the ribs of the tube.

Progressive guiding and smoothing of the corrugations of the fin coil convolutions are carried out by the fixed plates 50, 51, or, in the alternative, by the plate 51 in association with a tapered roller; and the discs of the respective sets 43, 44 and 45 continue the guiding and smoothing action, as well as the final slight reduction of fin diameter and the pressing of the fin to the groove root, and the deformation of the ribs into fin gripping position.

My copending application referred to above related among other things to a method of rolling fin grooves and spacing recesses as illustrated in FIGS. 19 through 22 of the present application. As shown in FIG. 19, fins 121 applied to the tube body 122 are illustrated in the form of the thin annular discs, although it is to be understood that the helical type of the earlier figures may be substituted. In order to receive these fins the outer circumference of the tube body 122 is rolled annularly to provide pairs of radially projecting, closely spaced ribs 123 having a fin-receiving groove 124 of slight axial width therebetween. As depicted in FIG. 19, successive pairs of these ribs are relatively widely spaced, for a correspondingly wide axial spacing of successive fins 121; and this is accomplished by the use of a relatively thin groove rolling disc 126, with relatively thick rib rolling discs 127, 128 fixedly mounted on either axial side thereof.

Thus the peripheral rolling suurface of disc 122 forms the grooving 124 between a pair of the ribs 123 which have been rolled up on either side thereof by adjacent peripheral surfaces 129 of the respective thicker discs or rollers 127, 128. The latter form the wider groove spaces 130 which separate successive pairs of parallel projecting grooves; and it is seen that by this preliminary rib forming roller procedure, the outer periphery and wall thickness of the tube body 122 are reduced but slightly from the original radial thickness dimension "A." The effect of the rolling, solely for producing the radial projecting circumferential ribs 123 and not to materially indent tube body 122, is hereinafter explained further.

With the groove defining ribs 123 thus produced, the finning 121 is applied thereto in a manner to be described and the ribs are then rolled toward the sides of the fin material 121 to clinch the latter firmly. This rolling operation may be performed by special rolling discs, as shown in FIGS. 21 and 22, also as will be further described.

FIG. 19 of the drawings shows the tube 122 rolled by a disc combination including lateral discs 127, 128 of substantial axial width, to space the successive groove defining ribs 123 substantially from one another in the axial sense. The view also shows the operations of forming the projecting grooved ribs and of clinching the ribs to the fins 121 following this; and the ribs as thus clinched are specially designated 123'.

On the other hand, FIG. 20 shows a similar tube body 122 having the fins 121 more closely spaced to one another in the axial sense, as by the use of a rib forming combination including lateral rolling discs 127', 128' of lesser axial width than those shown in FIG. 19. Thus as intersected by any given plane, axial or radial, successive pairs of the rib formations 123 may be more or less widely spaced from one another, in relation to the spacing of their component rib formation, by a proper selection of the grooving disc 126 and the respective ribbing discs 127, 128 or 127', 128'.

It is evident from the above that the described multiple ribbing and finning procedure for forming projecting ribs on the periphery of the tube to receive fins of the flat annular or helical type enables the simultaneous formation of at least one pair of grooved fin ribs 123 and the wider groove 130 spacing it from a succeeding pair at every relative rotation of the tube 122 and discs 126, 127, 128.

This multiple fin ribbing method controls the spaces between the ribs and the fins 121 gripped thereby, the root or minimum effective diameter of the two and the strength and height of the ribs which subsequently grip the base of the fin.

In the case of the production of a helically finned tube, the pitch angle setting for the rolling machine will include the axial thickness of the grooving disc 126 and one rib rolling disc 127 or 128, whether the latter is relatively thick or relatively thin, as in FIGS. 19 and 20, respectively, this pitch being designated "P."

FIGS. 21 and 22 illustrate alternative procedure for rolling the fin ribs 123 to their final gripping contour in which they are specially designated 123'. Thus in FIG. 21 there are two axially abutting rolling discs 132, 133 mounted on a common axis, with a rib clearance space 134 between their abutting center areas and their outer peripheries. An inner, annular rib-engaging and deforming surface 135 is provided on the disc 132 which is of such angularity as to cause the rib 123' rolled by it to be bent axially to the left as viewed in FIG. 21. On the other hand, the corresponding surface 135 of the other disc 133 is relieved or concavely curved slightly; and both discs are provided radially inwardly of the surfaces 135, 136 with rounded projecting, fin stabilizing or restraining shoulder portions 137, which slidingly engage the fin 121 radially outwardly of the grooved ribs 123.

Thus, as clinched by the rolling discs 132, 133 of FIG. 21, the fin is bent or dished somewhat in the annular zone 138 of its inner periphery, and an improved and more positive interlock between the fin and the clinched ribs 123' results.

FIG. 22 shows alternative further arrangements for improving the fin-rib interlock. Here, the reference numeral 140 designates a fin (either flat or helical) which has a slightly flanged annular offset 141 in one axial direction at its base or inner periphery. In the alternative, the reference numeral 142 indicates another type of fin which has an enlarged annular portion 143 at its inner periphery. In the rolling of these types, opposed rolling discs 144, 145 which are similar in nature and have annular fin engaging and stabilizing shoulders 146 may be employed.

Other alternative forms shown in FIG. 22 include a type of fin 148 which has an annular series of axially extending apertures 149 formed therethrough adjacent its base, into which apertures the material of the ribs 123 is swedged or deformed in the rolling operation. Other fins possible to be employed are one, being designated 150, in which the fin is uniformly tapered through its radial dimension outwardly from a relatively thick base; and another, being designated 151, in which the fin itself is rolled annularly in a zone 152 outwardly of its inner periphery, thus to provide a locking formation with which the material of the ribs 123 is interlocked when they are finally rolled in place.

FIG. 22 also shows a further alternative sectional contour of the rolling discs 154, 155 featuring a continuous radial clearance at 156 relative to the fin 150 (or any of the other fin types 140, 142, 148 and 151), in rolling the same.

The drawings and the foregoing specification constitute a description of the improved attached fin type tubes and method and apparatus for making the same in such full, clear, concise and exact terms as to enable any person skilled in the art to practice the invention, the scope of which is indicated by the appended claims.

What I claim is:

1. A method of applying fin material to a tube which is externally and helically ribbed circumferentially, comprising the steps of deforming axially coiled flat fin material adjacent the outer periphery of the coil convolution to progressively increase the inner periphery of the convolution to a diameter greater than the outer diameter of the tube ribs, guiding said deformed material into position radially outwardly of the space between the tube ribs, while positively supporting said deformed coiled fin material radially against interference with the ribs prior to reaching said position, and smoothing said fin deformation to cause a progressive reduction in said internal diameter of the convolution of the fin material toward the diameter of the tube between ribs, and to at least partially dispose said reduced internal diameter convolution in the space between said ribs.

2. A method of applying fin material to a tube which is externally ribbed circumferentially and helically, comprising the steps of radially corrugating the sides of axially coiled flat fin material adjacent the outer periphery of the coil convolution to progressively increase the inner periphery of the convolution to a diameter greater than the outer diameter of the tube ribs, guiding said corrugated material into position radially outwardly of the space between the tube ribs, while positively supporting said corrugated coiled fin material radially from the interior against interference with the ribs prior to reaching said position, and smoothing said fin corrugations while so guiding the fin material to cause a progressive reduction in said internal diameter of the convolution of the fin material toward the diameter of the tube between ribs, and to at least partially dispose said reduced internal diameter convolution in the space between said ribs.

3. A method of applying fin material to a tube, comprising providing a tube which is externally ribbed circumferentially and helically to afford axially spaced pairs of ribs separated by a space at which the outer tube diameter is not substantially less than its diameter between pairs of ribs, radially corrugating the sides of axially coiled flat fin material adjacent the outer periphery of the coil convolution to progressively increase the inner periphery of the coil convolution to a diameter greater than the outer diameter of the tube ribs, positively supporting said corrugated coil from the interior thereof to prevent interference with the ribs, guiding said material into the space between the ribs of a pair, with said corrugated coil convolution encircling the axis of the tube, and smoothing said fin corrugations while so guiding the fin material to cause a progressive reduction in said internal diameter of the fin material toward the diameter of the tube between said last named ribs, and to at least partially dispose said reduced internal diameter convolution in the space between said ribs.

4. A method of applying fin material to a tube which is internally formed circumferentially and helically to provide spaced pairs of ribs, comprising the steps of radially corrugating the sides of axially coiled flat fin material adjacent the outer periphery of the convolution to progressively increase the inner periphery of the coil convolution to a diameter greater than the outer diameter of the tube ribs, guiding said corrugated material into position radially outwardly of the space between the tube ribs, while positively supporting said corrugated material radially to prevent interference with said ribs prior to reaching said position, smoothing said fin corrugations while so guiding the corrugated fin material to cause a progressive reduction in the internal diameter of the convolution toward the diameter of the tube between ribs, and to at least partially dispose said reduced internal diameter convolution in the space between said ribs, and deforming the ribs into clinching engagement with the fin at the internal periphery of the latter.

5. A method of applying fin material to a helically ribbed tube, comprising the steps of forming elongated flat fin material into a coil of internal diameter approximating the root diameter of the tube between pairs of helical ribs of said tube, radially corrugating the sides of said coiled material adjacent the outer periphery of the coil convolution to progressively increase the inner periphery of the coil convolution to a diameter to approximate the outer diameter of the ribs, guiding said corrugated material into position radially outwardly of the space between said ribs, while positively supporting said coiled fin material radially to prevent interference with said ribs prior to reaching said position, and smoothing said fin corrugations to cause a progressive reduction in the internal diameter of the fin convolution encircling the tube, and to at least partially dispose said reduced internal diameter convolution in the space between said ribs.

6. A method of applying fin material to a helically ribbed tube, comprising the steps of forming elongated flat fin material into a coil of internal diameter approximating the root diameter of the tube between pairs of helical ribs of said tube, radially corrugating the sides of the convolution of coiled material adjacent the outer periphery thereof to progressively increase the inner periphery of the coil convolution to a diameter in excess of the outer diameter of the ribs, guiding said corrugated material into position radially outwardly of the space between said ribs during relative rotation of the tube and coil with the coil encircling the axis of the tube, while positively supporting said corrugated radially from the interior thereof to prevent interference with said ribs prior to reaching said position, and smoothing said fin corrugations to cause a progressive reduction in the internal diameter of the fin convolution encircling the tube outwardly of said space between the ribs, and to at least partially dispose said reduced internal diameter convolution in said space.

7. A method of applying fin material to a helically ribbed tube, comprising the steps of forming elongated flat fin material into a coil of internal diameter approximating the root diameter of the tube between pairs of helical ribs of said tube, radially corrugating the sides of the convolution of said coiled material adjacent the outer periphery thereof to progressively increase the inner periphery of the coil convolution to a diameter in excess of the outer diameter of the ribs, guiding said corrugated material into position radially outwardly of the space between said ribs, during relative rotation of the tube and coil with the coil encircling the axis of the tube, while positively supporting said corrugated coil radially from the interior thereof to prevent interference with said ribs prior to reaching said position, and smoothing said fin convolution corrugations while so guiding the fin to cause a progressive reduction in the internal diameter of the fin convolution encircling the tube outwardly of said space between the ribs, and to at least partially dispose said reduced internal diameter convolution in said space.

8. A method of applying fin material to a helically ribbed tube, comprising the steps of forming elongated flat fin material into a coil of internal diameter approximating the root diameter of the tube between pairs of helical ribs of said tube, radially corrugating the sides of the convolution of said coiled material adjacent the outer periphery thereof to progressively increase the inner periphery of the coil convolution to a diameter in excess of the outer diameter of the ribs, guiding said corrugated material into position radially outwardly of the space between said ribs during relative rotation of the tube and coil with the coil encircling the axis of the tube, while positively supporting said corrugated coil radially from the interior thereof to prevent interference with said ribs prior to reaching said position, smoothing said convolution corrugations while so guiding the fin to cause a progressive reduction in the internal diameter of the fin convolution encircling the tube outwardly of said space between the ribs, and to at least partially dispose said reduced internal diameter convolution in said space and deforming the ribs on opposite sides of the fin into clinching engagement with the fin at the internal periphery of the latter.

9. A method in accordance with claim 8, in which the smoothing of said fin corrugations is accomplished by subjecting both opposite sides of the corrugated zone to sliding frictional flattening action as the material is guided onto the tube.

10. A method in accordance with claim 8, in which the smoothing of said fin corrugations is accomplished by subjecting both sides of the corrugated zone to sliding frictional flattening action as the material is guided onto the tube, followed by rolling action on both sides to urge the fin material radially against the tube between the ribs of the latter.

11. A method in accordance with claim 8, in which the smoothing of said fin corrugations is accomplished by subjecting the opposite sides of the corrugated zone to sliding frictional flattening action and to rolling action, respectively, as the material is guided onto the tube.

12. A method in accordance with claim 8, in which the smoothing of said fin corrugations is accomplished by subjecting the opposite sides of the corrugated zone to sliding frictional flattening action and to rolling action, respectively, as the material is guided onto the tube, followed by rolling action on both sides to urge the fin material radially against the tube between the ribs of the latter.

13. A method for producing attached fin type tubing, comprising forming a tube length by an operation of externally rolling the same to provide a plurality of spaced pairs of rib formations which extend substantially and radially outwardly of the remaining exterior surface of the tube, with the pairs spaced from one another by spacing grooves and the formations of each pair spaced from one another by a fin groove, said rolling operation comprising simultaneously subjecting the tube exterior to the rolling and indenting action of at least three discs of selectively variable dimension axially of the respective discs, which discs engage the tube in close axial adjacency to one another, thereby to deform the tube in desired selective widths of the respective spacing and fin grooves and to upset material between an intermediate disc and discs on either side thereof to provide a pair of rib formations, placing fin material in the fin groove between said pair, and securing said fin material between said respective rib formations.

14. A method of producing attached fin type tubing, comprising circumferentially rolling a tube length by an operation of externally rolling the same to provide a plurality of spaced pairs of rib formations which extend substantially and radially outwardly of the remaining exterior surface of the tube, with the pairs spaced from one another by spacing grooves and the formations of each pair spaced from one another by a fin groove, said rolling operation comprising simultaneously subjecting the tube exterior to the rolling and indenting action of at least three discs of selectively variable dimension axially of the respective discs, which discs engage the tube in close axial adjacency to one another, thereby to deform the tube in desired selective widths of the respective spacing and fin grooves and to upset material between an intermediate disc and discs on either side thereof to provide a pair of rib formations, placing fin material in the fin groove between said pair, and rolling said projecting rib formations to clinch said fin material between the same.

15. A method in accordance with claim 14, in which said clinching of the rib formations includes providing an interlock of fin material to rib formation which is more positive than said clinched securement, which interlock is effected by interengaging a clinched rib formation with an offset of said fin material at the clinched zone thereof.

16. A method in accordance with claim 14, in which said clinching of the rib formations includes providing an interlock of fin material to rib formation which is more positive than said clinched securement, which interlock is effected by engaging the material of a clinched rib formation in a recess of said fin material at the clinched zone thereof.

References Cited in the file of this patent

UNITED STATES PATENTS

| | | |
|---|---|---|
| 1,303,674 | James | May 13, 1919 |
| 1,668,534 | Berg | May 1, 1928 |
| 1,775,555 | Dorndorf | Sept. 9, 1930 |
| 1,840,317 | Horvath | Jan. 12, 1932 |
| 1,928,639 | Berg | Oct. 3, 1933 |
| 2,004,387 | Dewald | June 11, 1935 |
| 2,396,795 | Lea | Mar. 19, 1946 |
| 2,661,526 | Bruegger | Dec. 8, 1953 |